United States Patent
Inoue

(10) Patent No.: US 10,440,232 B2
(45) Date of Patent: Oct. 8, 2019

(54) IMAGE FORMING APPARATUS

(71) Applicant: Oki Data Corporation, Tokyo (JP)

(72) Inventor: Hiroyuki Inoue, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/133,947

(22) Filed: Sep. 18, 2018

(65) Prior Publication Data

US 2019/0098176 A1    Mar. 28, 2019

(30) Foreign Application Priority Data

Sep. 26, 2017 (JP) ................. 2017-184660

(51) Int. Cl.
| | |
|---|---|
| *H04N 1/60* | (2006.01) |
| *G03G 15/16* | (2006.01) |
| *G03G 15/00* | (2006.01) |
| *H04N 1/46* | (2006.01) |
| *G03G 15/01* | (2006.01) |
| *G03G 15/08* | (2006.01) |
| *G03G 15/043* | (2006.01) |
| *H04N 1/54* | (2006.01) |

(52) U.S. Cl.
CPC ....... *H04N 1/6008* (2013.01); *G03G 15/0121* (2013.01); *G03G 15/0808* (2013.01); *G03G 15/1625* (2013.01); *G03G 15/6585* (2013.01); *H04N 1/46* (2013.01); *H04N 1/6016* (2013.01); *G03G 15/043* (2013.01); *G03G 15/6591* (2013.01); *G03G 2215/00527* (2013.01); *H04N 1/54* (2013.01)

(58) Field of Classification Search
None
See application file for complete search history.

(56) References Cited

U.S. PATENT DOCUMENTS

| | | | | |
|---|---|---|---|---|
| 5,412,489 A | * | 5/1995 | Hirota | H04N 1/401 348/615 |
| 6,271,868 B1 | * | 8/2001 | Kashihara | G03G 15/011 347/115 |
| 2005/0063721 A1 | * | 3/2005 | Nakayama | G03G 15/0121 399/49 |
| 2007/0223019 A1 | * | 9/2007 | Maeyama | G03G 15/6585 358/1.9 |

(Continued)

FOREIGN PATENT DOCUMENTS

JP    2014-216721 A    11/2014

*Primary Examiner* — Anh-Vinh T Nguyen
(74) *Attorney, Agent, or Firm* — Rabin & Berdo, P.C.

(57) ABSTRACT

An image forming apparatus includes an image processing section and an image forming section. The image processing section corrects, on the basis of pieces of image data, a pixel value corresponding to an auxiliary color developer in a first pixel and thereby causes a developer amount in the first pixel to fall within a predetermined range. The pieces of image data correspond to respective developers including one or more basic color developers that configure an image and the auxiliary color developer. The developer amount in the first pixel is a total amount of the one or more basic color developers and the auxiliary color developer in the first pixel when the one or more basic color developers and the auxiliary color developer are disposed on each other. The image forming section forms an image on a transfer print medium on the basis of the pieces of processed image data processed.

11 Claims, 10 Drawing Sheets

(56) References Cited

U.S. PATENT DOCUMENTS

| | | | |
|---|---|---|---|
| 2009/0273811 A1* | 11/2009 | Omata | H04N 1/54 |
| | | | 358/3.01 |
| 2012/0014702 A1* | 1/2012 | Takemura | G03G 15/0126 |
| | | | 399/46 |
| 2012/0051814 A1* | 3/2012 | Fukamachi | G03G 15/6585 |
| | | | 399/341 |
| 2012/0051816 A1* | 3/2012 | Chiyoda | G03G 15/2064 |
| | | | 399/341 |
| 2012/0195607 A1* | 8/2012 | Inoue | G03G 15/5008 |
| | | | 399/38 |
| 2013/0101303 A1* | 4/2013 | Kasai | G03G 15/205 |
| | | | 399/45 |
| 2013/0164004 A1* | 6/2013 | Ai | G03G 15/6585 |
| | | | 399/40 |
| 2013/0271791 A1* | 10/2013 | Miyazaki | G06K 15/025 |
| | | | 358/2.1 |
| 2013/0278943 A1* | 10/2013 | Kurosawa | G03G 15/0121 |
| | | | 358/1.1 |
| 2014/0119779 A1* | 5/2014 | Zaretsky | G03G 15/224 |
| | | | 399/231 |
| 2015/0373228 A1 | 12/2015 | Ukishima | |
| 2016/0282781 A1* | 9/2016 | Kunimori | G03G 15/556 |
| 2017/0285534 A1* | 10/2017 | Kawano | G03G 15/1605 |
| 2019/0094736 A1* | 3/2019 | Tominaga | G03G 15/0131 |

* cited by examiner

IMAGE FORMING APPARATUS

CROSS REFERENCE TO RELATED APPLICATIONS

The present application claims priority from Japanese Patent Application No. 2017-184660 filed on Sep. 26, 2017, the entire contents of which are hereby incorporated by reference.

BACKGROUND

The technology relates to an image forming apparatus that forms an image on a transfer print medium.

There exists an image forming apparatus that uses, for example, a white toner in addition to color toners, i.e., basic color toners, for forming an image. The basic colors toners include, for example, a cyan toner, a magenta toner, a yellow toner, and a black toner. The white toner is used, for example, to reduce an influence of a ground color of a recording print medium on an image, as disclosed in Japanese Unexamined Patent Application Publication No. 2014-216721, for example.

SUMMARY

For example, in a case where an image is to be formed on a T-shirt, a transfer sheet, i.e., a transfer print medium, may often be used. In one example, an image may be formed once on a transfer print medium, an adhesive may be placed onto an image portion of this transfer print medium with the use of an adhesive sheet, and the image may be transferred onto the T-shirt from the transfer print medium with the use of an iron, for example. Even in this case, it is expected that a high image quality be achieved.

It is desirable to provide an image forming apparatus that makes it possible to improve an image quality.

According to one embodiment of the technology, there is provided an image forming apparatus that includes an image processing section and an image forming section. The image processing section corrects, on the basis of a plurality of pieces of image data, a pixel value corresponding to an auxiliary color developer in a first pixel and thereby causes a developer amount in the first pixel to fall within a predetermined range. The plurality of pieces of image data corresponding to respective developers include one or more basic color developers that configure an image and the auxiliary color developer. The developer amount in the first pixel is a total amount of the one or more basic color developers and the auxiliary color developer in the first pixel when the one or more basic color developers and the auxiliary color developer are disposed on each other. The image forming section forms an image on a transfer print medium on the basis of the pieces of image data processed by the image processing section.

DETAILED DESCRIPTION

Figure 1:
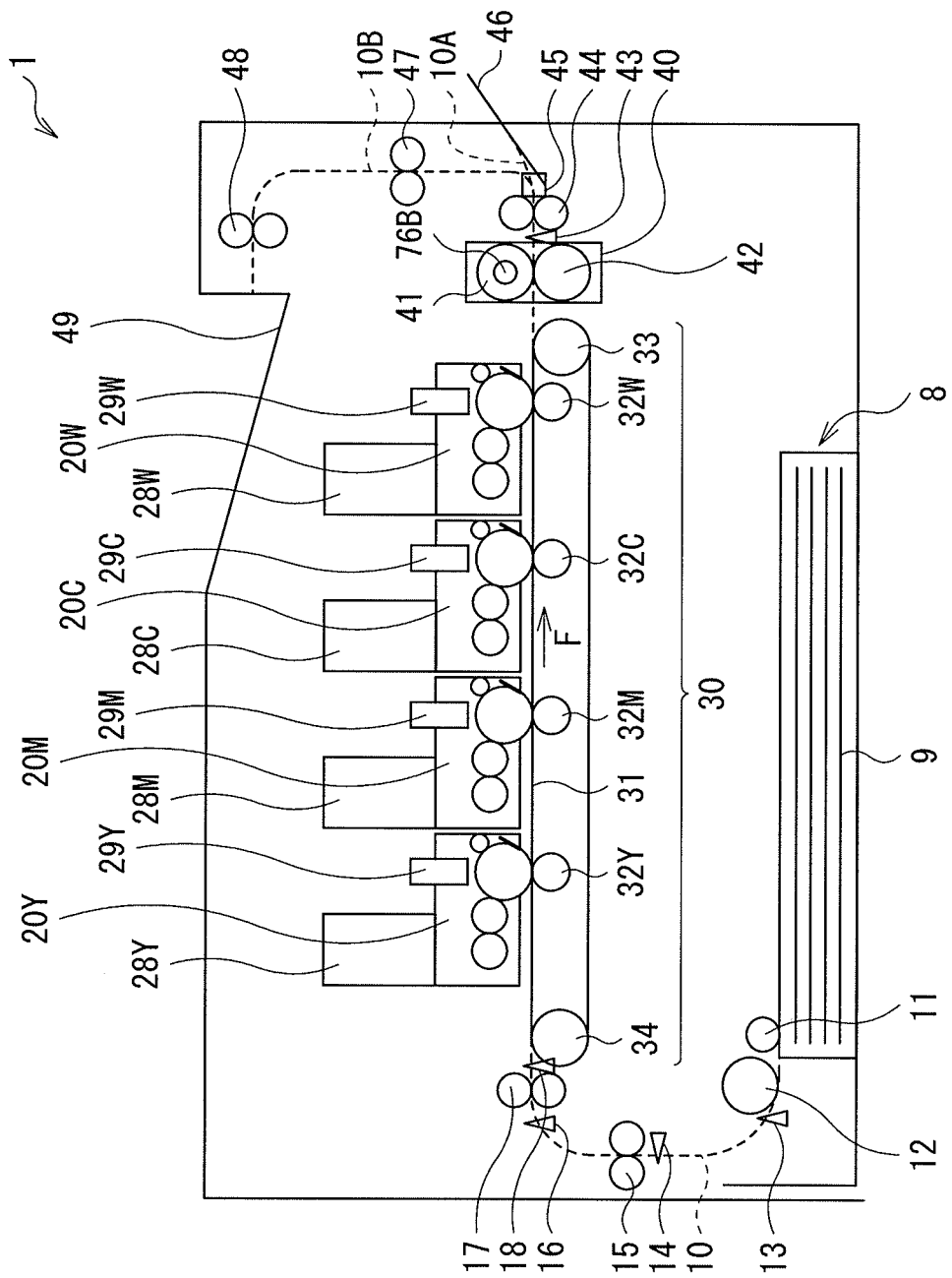
FIG. 1 is a descriptive diagram illustrating an example of a configuration of an image forming apparatus according to one embodiment.

Hereinafter, some example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description will be given in the following order.

1. First Example Embodiment
2. Second Example Embodiment

1. First Example Embodiment

Configuration Example

FIG. 1 illustrates an example of a configuration of an image forming apparatus, i.e., an image forming apparatus 1, according to an example embodiment of the technology. The image forming apparatus 1 may serve as a printer that forms an image on a transfer print medium with the use of an electrophotographic scheme.

The image forming apparatus 1 may include a pickup roller 11, a print medium feeding roller 12, print medium sensors 13 and 14, a registration roller 15, a print medium sensor 16, a registration roller 17, a print medium sensor 18, four developing units 20, four toner containers 28, four exposure units 29, a transfer section 30, a fixing section 40, a print medium sensor 43, a conveying roller 44, a conveyance path switching section 45, a conveying roller 47, and a discharge roller 48. The four developing units 20 may include developing units 20Y, 20M, 20C, and 20W. The four toner containers 28 may include toner containers 28Y, 28M, 28C, and 28W. The four exposure units 29 may include exposure units 29Y, 29M, 29C, and 29W. The aforementioned members may be disposed along a conveyance path 10 through which a transfer print medium 9 is conveyed.

The pickup roller 11 may pick up the transfer print medium 9 stored in a print medium container 8, one by one, from the uppermost sheet and send out the picked-up transfer print medium 9 into the conveyance path 10. The pickup roller 11 may rotate with motive power transmitted from a print medium feeding roller motor 71B, which will be described later.

The print medium feeding roller 12 may convey, along the conveyance path 10, the transfer print medium 9 fed from the pickup roller 11. The print medium feeding roller 12 may rotate with motive power transmitted from the print medium feeding roller motor 71B, which will be described later.

The print medium sensors 13 and 14 may detect passage of the transfer print medium 9.

The registration roller 15 may include a pair of rollers disposed with the conveyance path 10 interposed therebetween. The registration roller 15 may correct a skew of the fed transfer print medium 9 and convey the transfer print medium 9 along the conveyance path 10. The registration roller 15 may rotate with motive power transmitted from a registration roller motor 72B, which will be described later.

The print medium sensor 16 may detect passage of the transfer print medium 9.

The registration roller 17 may include a pair of rollers disposed with the conveyance path 10 interposed therebetween. The registration roller 17 may correct a skew of the fed transfer print medium 9 and convey the transfer print medium 9 along the conveyance path 10. The registration roller 17 may rotate with motive power transmitted from the registration roller motor 72B, which will be described later.

The print medium sensor 18 may detect passage of the transfer print medium 9.

The four developing units 20 may form respective toner images. In one example, the developing unit 20Y may form a yellow (Y) toner image, the developing unit 20M may form a magenta (M) toner image, the developing unit 20C may form a cyan (C) toner image, and the developing unit 20W may form a white (W) toner image. In this example, the four developing units 20 may be disposed in the order of the developing units 20Y, 20M, 20C, and 20W in a conveying direction F of the transfer print medium 9. Each of the developing units 20 may be mountable and removable.

The four toner containers 28 may each contain a toner. In one example, the toner container 28Y may contain a yellow toner, the toner container 28M may contain a magenta toner, the toner container 28C may contain a cyan toner, and the toner container 28W may contain a white toner. The four toner containers 28 may each be mountable to and removable from the corresponding one of the four developing units 20.

Figure 2:
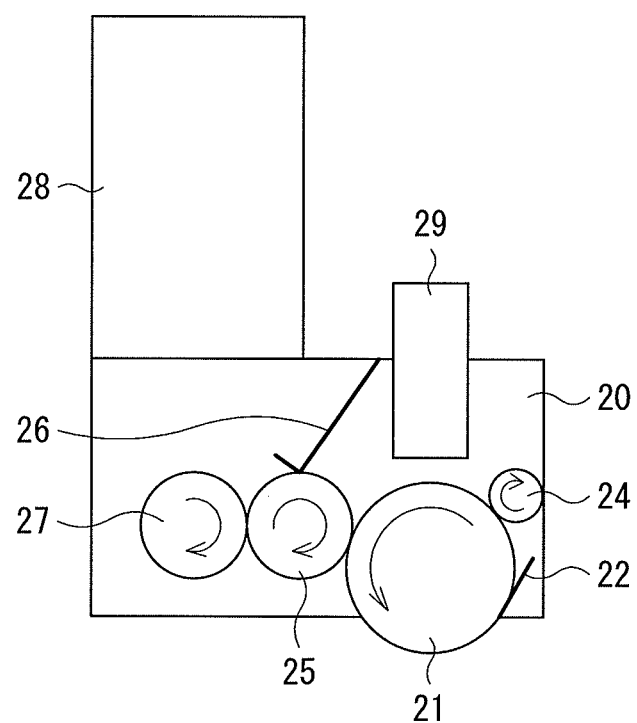
FIG. 2 is a descriptive diagram illustrating an example of a configuration of a developing unit illustrated in FIG. 1.

FIG. 2 illustrates an example of a configuration of the developing unit 20. FIG. 2 depicts the toner container 28 and the exposure unit 29 as well. The developing unit 20 may include a photosensitive drum 21, a cleaning blade 22, a charging roller 24, a developing roller 25, a developing blade 26, and a feeding roller 27.

The photosensitive drum 21 may support an electrostatic latent image on a surface thereof, i.e., on a surface layer portion thereof. In this example, the photosensitive drum 21 may rotate counterclockwise with motive power transmitted from a photosensitive drum motor 73B, which will be described later. The photosensitive drum 21 may be electrically charged by the charging roller 24 and submitted to exposure by the exposure unit 29. In one example, the photosensitive drum 21 in the developing unit 20Y may be submitted to exposure by the exposure unit 29Y, the photosensitive drum 21 in the developing unit 20M may be submitted to exposure by the exposure unit 29M, the photosensitive drum 21 in the developing unit 20C may be submitted to exposure by the exposure unit 29C, and the photosensitive drum 21 in the developing unit 20W may be submitted to exposure by the exposure unit 29W. With this operation, an electrostatic latent image may be formed on the surface of each photosensitive drum 21. Thereafter, a toner may be fed to the photosensitive drum 21 by the developing roller 25, and thus a toner image corresponding to the electrostatic latent image may be formed on the photosensitive drum 21.

The cleaning blade 22 may clean the surface, i.e., the surface layer portion, of the photosensitive drum 21 by scraping any of remaining toner off the surface. The cleaning blade 22 may be disposed with a tip thereof being in contact with the photosensitive drum 21.

The charging roller 24 may electrically charge the surface, i.e., the surface layer portion, of the photosensitive drum 21 substantially uniformly. The charging roller 24 may be so disposed as to be in contact with the surface, i.e., a peripheral surface, of the photosensitive drum 21. The charging roller 24 may be so disposed as to be pressed against the photosensitive drum 21 at predetermined pressing force. In this example, the charging roller 24 may rotate clockwise in response to the rotation of the photosensitive drum 21. The charging roller 24 may have a charging voltage VCH applied thereto by a high-voltage power source section 61, which will be described later.

The developing roller 25 may support a toner on a surface thereof. The developing roller 25 may be so disposed as to be in contact with the surface, i.e., the peripheral surface, of the photosensitive drum 21. The developing roller 25 may be so disposed as to be pressed against the photosensitive drum 21 at predetermined pressing force. In this example, the developing roller 25 may rotate clockwise with motive power transmitted from the photosensitive drum motor 73B, which will be described later. The developing roller 25 may have a developing voltage VDB applied thereto by the high-voltage power source section 61, which will be described later.

The developing blade 26 may come into contact with the surface of the developing roller 25. Thus, the developing blade 26 may form a layer of a toner, i.e., a toner layer, on the surface of the developing roller 25 and control or adjust the thickness of the toner layer. The developing blade 26 may be, for example, a plate-shaped elastic member bent in an L-like shape and including a material such as stainless steel. The developing blade 26 may be disposed with its bent portion being in contact with the surface of the developing roller 25. The developing blade 26 may be so disposed as to be pressed against the developing roller 25 at predetermined pressing force.

The feeding roller 27 may feed the toner contained in the toner container 28 to the developing roller 25. The feeding roller 27 may be so disposed as to be in contact with the surface, i.e., the peripheral surface, of the developing roller 25. The feeding roller 27 may be so disposed as to be pressed against the developing roller 25 at predetermined pressing force. In this example, the feeding roller 27 may rotate clockwise with motive power transmitted from the photosensitive drum motor 73B, which will be described later. With this configuration, friction may be produced between the surface of the feeding roller 27 and the surface of the developing roller 25 in each developing unit 20. As a result, the toner may become electrically charged through what is known as frictional charging in each developing unit 20. The feeding roller 27 may have a feeding voltage VSB applied thereto by the high-voltage power source section 61, which will be described later.

The four exposure units 29 illustrated in FIG. 1 may each irradiate, with light, the photosensitive drum 21 in the corresponding one of the developing units 20. In one example, the exposure unit 29Y may irradiate the photosensitive drum 21 in the developing unit 20Y with light, the exposure unit 29M may irradiate the photosensitive drum 21 in the developing unit 20M with light, the exposure unit 29C may irradiate the photosensitive drum 21 in the developing unit 20C with light, and the exposure unit 29W may irradiate the photosensitive drum 21 in the developing unit 20W with light. The exposure units 29 may each include, for example, a plurality of light-emitting diodes that are arrayed in a main scanning line direction, which is the depthwise direction in FIG. 1. The exposure units 29 may each irradiate the photosensitive drum 21 with light on a dot-by-dot basis with the use of the stated light-emitting diodes. With this configuration, each of the photosensitive drums 21 may be submitted to exposure by corresponding one of the exposure units 29, and an electrostatic latent image may be formed on the surface of the relevant photosensitive drum 21.

The transfer section 30 may transfer the four toner images formed by the respective developing units 20 onto a transfer target surface of the transfer print medium 9. The transfer section 30 may include a transfer belt 31, four transfer rollers 32, a driving roller 33, and a driven roller 34. The four transfer rollers 32 may include transfer rollers 32Y, 32M, 32C, and 32W.

The transfer belt 31 may convey the transfer print medium 9 in the conveying direction F along the conveyance path 10. The transfer belt 31 may lie on the driving roller 33 and the driven roller 34 while being stretched. Thus, the transfer belt 31 may be conveyed in a circulating manner in the conveying direction F in response to the rotation of the driving roller 33.

The four transfer rollers 32 may each transfer, onto the transfer print medium 9, the toner image formed on the surface of the photosensitive drum 21 in the corresponding one of the developing units 20. The transfer roller 32Y may be so disposed as to oppose the photosensitive drum 21 in the developing unit 20Y with the conveyance path 10 and the transfer belt 31 interposed therebetween. The transfer roller 32M may be so disposed as to oppose the photosensitive drum 21 in the developing unit 20M with the conveyance path 10 and the transfer belt 31 interposed therebetween. The transfer roller 32C may be so disposed as to oppose the photosensitive drum 21 in the developing unit 20C with the conveyance path 10 and the transfer belt 31 interposed therebetween. The transfer roller 32W may be so disposed as to oppose the photosensitive drum 21 in the developing unit 20W with the conveyance path 10 and the transfer belt 31 interposed therebetween. The transfer rollers 32Y, 32M, 32C, and 32W may each have a transfer voltage VTR applied thereto by the high-voltage power source section 61, which will be described later. With this configuration, the toner images formed by the respective developing units 20 may be transferred onto the transfer target surface of the transfer print medium 9 in the image forming apparatus 1.

The driving roller 33 may convey the transfer belt 31 in a circulating manner. In this example, the driving roller 33 may be disposed downstream from the four developing units 20 in the conveying direction F. In this example, the driving roller 33 may rotate clockwise with motive power transmitted from a transfer belt motor 74B, which will be described later.

The driven roller 34 may be driven to rotate in response to the circulating conveyance of the transfer belt 31. In this example, the driven roller 34 may be disposed upstream from the four developing units 20 in the conveying direction F.

The fixing section 40 may apply heat and pressure onto the transfer print medium 9 and thus fix, to the transfer print medium 9, the toner images transferred onto the transfer print medium 9. The fixing section 40 may include a fixing roller 41 and a backup roller 42. The fixing roller 41 may apply heat to the toner on the transfer print medium 9. The fixing roller 41 may include a heater 76B provided thereinside. A halogen heater may be used as the heater 76B, for example. The fixing roller 41 may rotate with motive power transmitted from a fixing roller motor 75B, which will be described later. The backup roller 42 may apply pressure to the toner on the transfer print medium 9. The backup roller 42 may be so disposed as to allow a pressure contact portion to be provided between the backup roller 42 and the fixing roller 41. With this configuration, the toner on the transfer print medium 9 may be heated, be molten, and have pressure applied thereto in the fixing section 40. As a result, the toner images may be fixed onto the transfer print medium 9.

The print medium sensor 43 may detect passage of the transfer print medium 9.

The conveying roller 44 may include a pair of rollers disposed with the conveyance path 10 interposed therebetween. The conveying roller 44 may convey, along the conveyance path 10, the transfer print medium 9 having the toner images fixed thereto.

The conveyance path switching section 45 may switch a path through which the transfer print medium 9 having the toner images fixed thereto is conveyed. In one example, the conveyance path switching section 45 may send out the transfer print medium 9 into a path selected from a conveyance path 10A and a conveyance path 10B. The conveyance path 10A may be a path leading to a face-up stacker 46, and the conveyance path 10B may be a path leading to a face-down stacker 49. In a case where the conveyance path 10A has been selected, the transfer print medium 9 may be stacked on the face-up stacker 46.

The conveying roller 47 may include a pair of rollers disposed with the conveyance path 10B interposed therebetween. The conveying roller 47 may convey, along the conveyance path 10B, the transfer print medium 9 having the toner images fixed thereto.

The discharge roller 48 may include a pair of rollers disposed with the conveyance path 10B interposed therebetween. The discharge roller 48 may convey, along the conveyance path 10B, the transfer print medium 9 having the toner images fixed thereto and discharge the transfer print medium 9. The discharged transfer print medium 9 may be stacked on the face-down stacker 49.

In this manner, an image may be formed on the transfer print medium 9 in the image forming apparatus 1. In this example, a user may transfer the image formed on the transfer print medium 9 onto a T-shirt. In one example, the user may place an adhesive on an image portion of the transfer print medium 9 with the use of an adhesive sheet. Thereafter, the user may transfer the image from the transfer print medium 9 onto the T-shirt with the use of an iron.

[Control Mechanism in Image Forming Apparatus 1]

Figure 3:
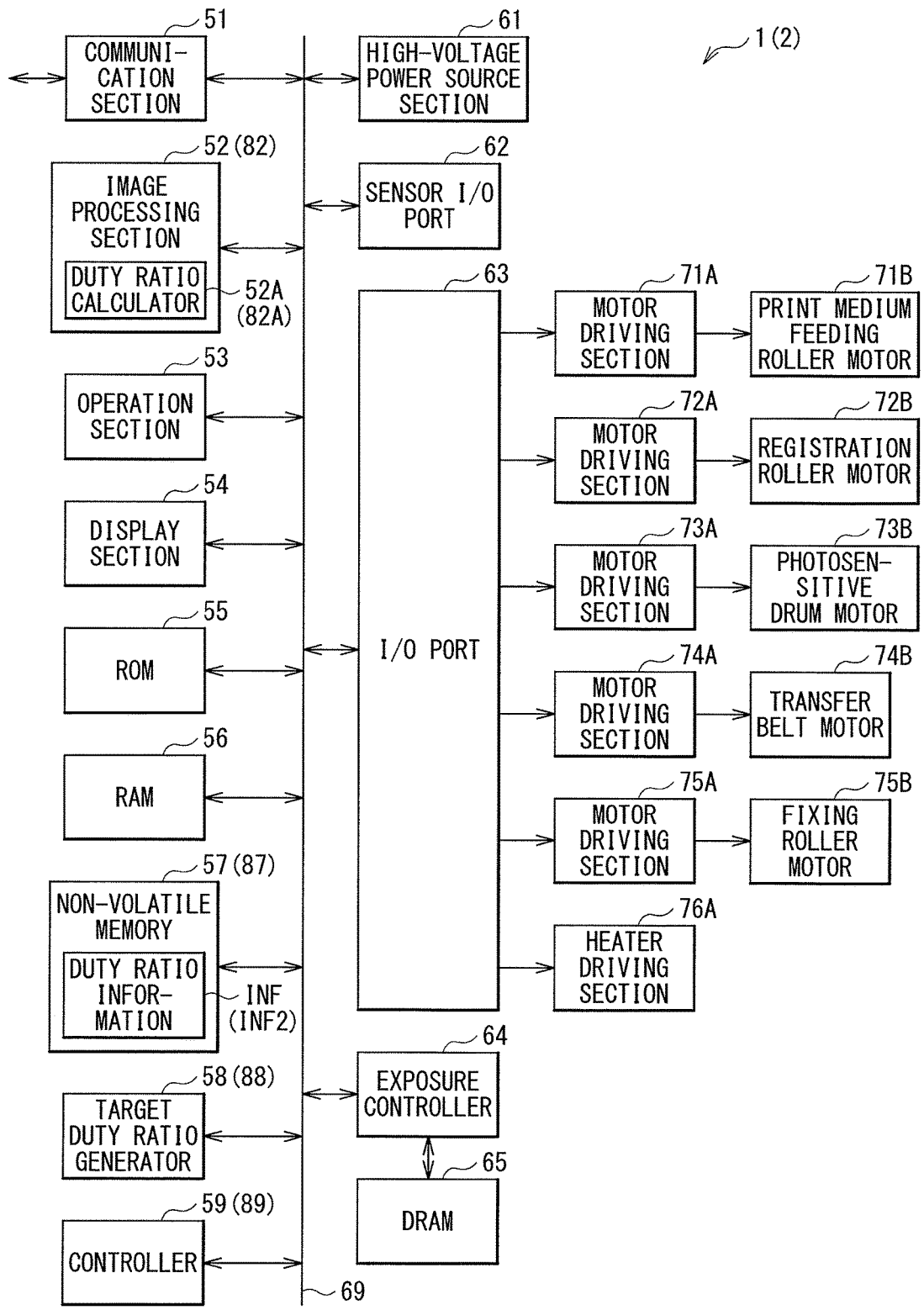
FIG. 3 is a block diagram illustrating an example of a configuration of the image forming apparatus illustrated FIG. 1.

FIG. 3 illustrates an example of a control mechanism in the image forming apparatus 1. The image forming apparatus 1 may include a communication section 51, an image processing section 52, an operation section 53, a display section 54, a read-only memory (ROM) 55, a random-access memory (RAM) 56, a non-volatile memory 57, a target duty ratio generator 58, a controller 59, the high-voltage power source section 61, a sensor input/output (I/O) port 62, an I/O port 63, motor driving sections 71A to 75A, the print medium feeding roller motor 71B, the registration roller motor 72B, the photosensitive drum motor 73B, the transfer belt motor 74B, the fixing roller motor 75B, a heater driving section 76A, an exposure controller 64, and a dynamic random-access memory (DRAM) 65. The communication section 51, the image processing section 52, the operation section 53, the display section 54, the ROM 55, the RAM 56, the non-volatile memory 57, the target duty ratio generator 58, the controller 59, the high-voltage power source section 61, the sensor I/O port 62, the I/O port 63, and the exposure controller 64 may be coupled to a control line 69.

The communication section 51 may perform communication with the use of Universal Serial Bus (USB) or a local area network (LAN), for example. The communication section 51 may receive print data DP transmitted from an unillustrated host computer, for example.

The image processing section 52 may convert image data D1 included in the print data DP into image data D2. The image data D2 may be bitmap data of a so-called pixel format. The image data D2 may include yellow image data D2Y, magenta image data D2M, cyan image data D2C, and white image data D2W.

The image processing section 52 may include a duty ratio calculator 52A. The duty ratio calculator 52A may obtain a duty ratio DRY in each pixel P on the basis of the yellow image data D2Y, obtain a duty ratio DRM in each pixel P on the basis of the magenta image data D2M, obtain a duty ratio DRC in each pixel P on the basis of the cyan image data D2C, and obtain a duty ratio DRW in each pixel P on the basis of the white image data D2W. Thereafter, the duty ratio calculator 52A may obtain a total value, i.e., a total duty ratio DRtotal, of the four duty ratios DRY, DRM, DRC, and DRW in each pixel P. Further, the duty ratio calculator 52A may correct the duty ratio DRW in each pixel P and thereby cause the total duty ratio DRtotal to become no lower than a target duty ratio DRA. The target duty ratio DRA may be such a total duty ratio DRtotal that makes it possible to obtain favorable transfer characteristics when an image is transferred from the transfer print medium 9 onto a T-shirt.

Figure 4:
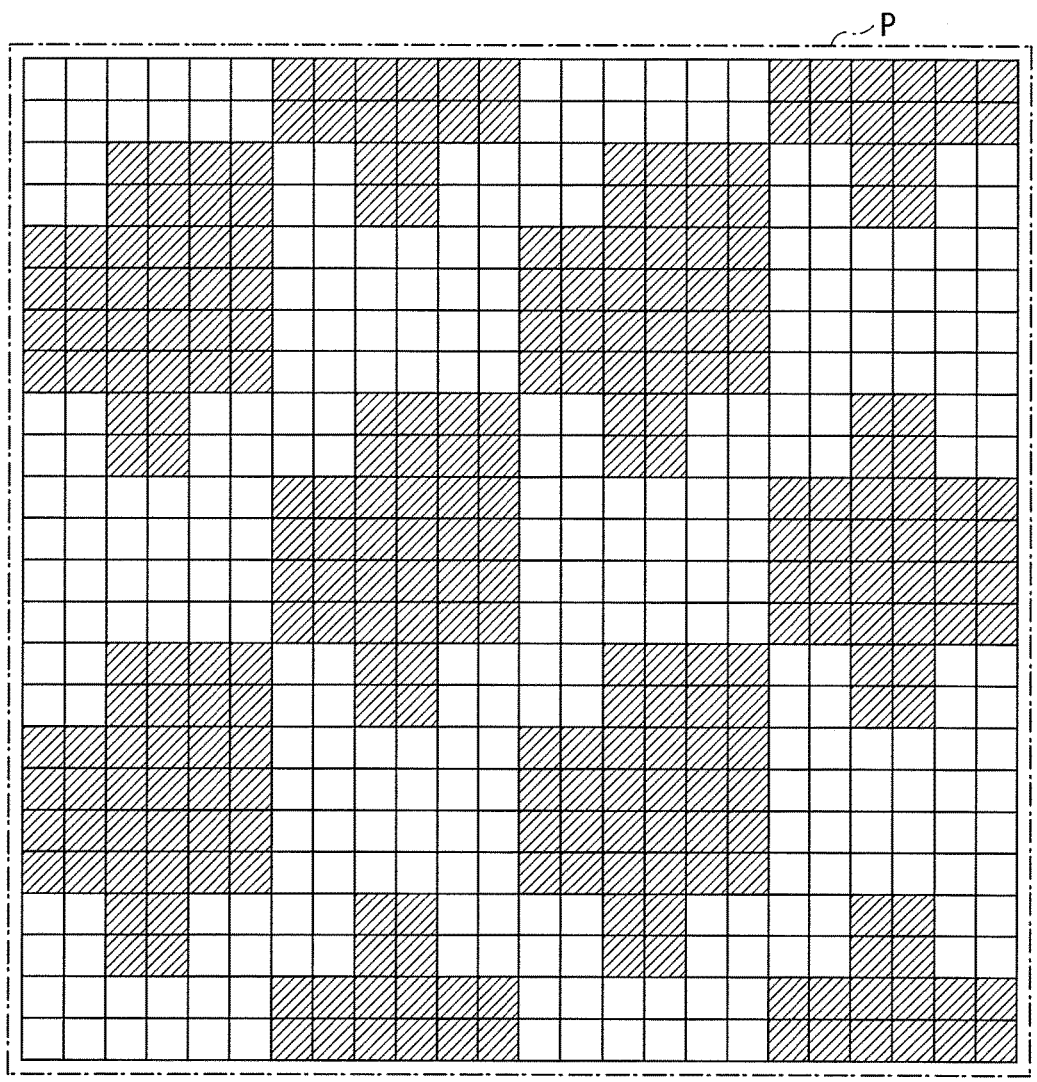
FIG. 4 is a descriptive diagram illustrating an example of a duty ratio.

FIG. 4 illustrates an example of a duty ratio DR. In FIG. 4, each square may represent a dot corresponding to a light-emitting diode in the exposure unit 29. In other words, a dot may be the smallest unit in an image forming operation. In this example, one pixel P may include 576 (=24×24) dots. A dot with oblique lines may represent a dot in which the light-emitting diode emits light, and a white dot may represent a dot in which the light-emitting diode does not emit light.

In the image forming apparatus 1, the shade of the toner density may be expressed through so-called area coverage modulation. For example, in a pixel P, the toner density in that pixel P may be higher as the number of dots in which the light-emitting diodes emit light is greater. In a pixel P, the toner density in that pixel P may be lower as the number of dots in which the light-emitting diodes emit light is smaller.

The duty ratio DR may represent the proportion of the dots in which the light-emitting diodes emit light with respect to all of the dots within a given pixel P. In one example, in a case where all of the dots in a given pixel P are the dots in which the light-emitting diodes emit light, the duty ratio DR in that pixel P may be 100%. In a case where all of the dots in a given pixel P are the dots in which the light-emitting diodes do not emit light, the duty ratio DR may be 0%. In the example illustrated in FIG. 4, the duty ratio DR is about 50%. In this manner, the toner density in each pixel P may correlate with the duty ratio DR.

The duty ratio calculator 52A may obtain the duty ratios DR, i.e., the duty ratios DRY, DRM, DRC, and DRW, in each pixel P on the basis of the four pieces of image data D2Y, D2M, D2C, and D2W, respectively. Thereafter, the duty ratio calculator 52A may obtain the total value, i.e., the total duty ratio DRtotal, of the four duty ratios DRY, DRM, DRC, and DRW in each pixel P. Further, the duty ratio calculator 52A may correct the duty ratio DRW in each pixel P and thereby cause the total duty ratio DRtotal to become no lower than the target duty ratio DRA. The duty ratio calculator 52A may thereafter update the white image data D2W on the basis of the corrected duty ratio DRW. This configuration makes it possible to ensure no smaller than a predetermine amount of toner in each pixel P in the image forming apparatus 1, as will be described later. Thus, it is possible to obtain favorable transfer characteristics when an image is transferred from the transfer print medium 9 onto a T-shirt, which makes it possible to improve the image quality as a result.

The operation section 53 may receive a user operation. The operation section 53 may include components such as various buttons, for example. The display section 54 may display information such as an operating state of the image forming apparatus 1 and an instruction to the user. The display section 54 may include a liquid crystal display or various indicators, for example.

The ROM 55 may hold a program to be executed in the image forming apparatus 1. The RAM 56 may serve as a transitory storage area used when the image forming apparatus 1 executes a program.

The non-volatile memory 57 may hold various pieces of setting information in the image forming apparatus 1. The non-volatile memory 57 may hold duty ratio information INF. The duty ratio information INF may hold the target duty ratio DRA. The target duty ratio DRA may be such a total duty ratio DRtotal that makes it possible to obtain favorable transfer characteristics when an image is transferred from the transfer print medium 9 onto a T-shirt. The target duty ratio DRA may be set in advance in the image forming apparatus 1. In addition, the non-volatile memory 57 may also be able to hold, as the duty ratio information INF, the target duty ratio DRA generated on the basis of a user operation, in accordance with an instruction from the target duty ratio generator 58.

The target duty ratio generator 58 may generate the target duty ratio DRA on the basis of information input by the user operating the operation section 53, for example. The generated target duty ratio DRA may be stored as the duty ratio information INF into the non-volatile memory 57.

The controller 59 may control an overall operation of the image forming apparatus 1 by controlling an operation of each block in the image forming apparatus 1. The controller 59 may have a timer embedded therein, for example, and determine operation timing of each block with the use of the timer.

The high-voltage power source section 61 may generate various voltages, e.g., the charging voltage VCH, the developing voltage VDB, the feeding voltage VSB, and the transfer voltage VTR, used in the developing units 20 and the transfer section 30.

The sensor I/O port 62 may receive detection results in various sensors, such as print medium sensors 13, 14, 16, 18, and 43.

The I/O port 63 may supply the motor driving sections 71A to 75A with control signals for causing the respective motors to operate. The I/O port 63 may also supply the heater driving section 76A with a control signal for causing the heater 76B to operate. The motor driving section 71A may drive the print medium feeding roller motor 71B. The print medium feeding roller motor 71B may supply motive power to the pickup roller 11 and the print medium feeding roller 12. The motor driving section 72A may drive the registration roller motor 72B. The registration roller motor 72B may supply motive power to the registration rollers 15 and 17. The motor driving section 73A may drive the photosensitive drum motor 73B. The photosensitive drum motor 73B may supply motive power to the photosensitive drums 21, the developing rollers 25, and the feeding rollers 27 in the respective four developing units 20. The motor driving section 74A may drive the transfer belt motor 74B. The transfer belt motor 74B may supply motive power to the driving roller 33. The motor driving section 75A may drive the fixing roller motor 75B. The fixing roller motor 75B may supply motive power to the fixing roller 41. The print medium feeding roller motor 71B, the registration roller motor 72B, the photosensitive drum motor 73B, the transfer belt motor 74B, and the fixing roller motor 75B may each include a stepping motor, i.e., a pulse motor, for example. The heater driving section 76A may drive the heater 76B provided in the fixing roller 41.

The exposure controller 64 may control an exposure operation in the four exposure units 29 on the basis of the image data D2, i.e., the image data D2Y, D2M, D2C, and D2W. In one example, the exposure controller 64 may control an exposure operation in the exposure unit 29Y on the basis of the image data D2Y, control an exposure operation in the exposure unit 29M on the basis of the image data D2M, control an exposure operation in the exposure unit 29C on the basis of the image data D2C, and control an exposure operation in the exposure unit 29W on the basis of the image data D2W. The DRAM 65 may temporarily hold the image data D2.

The image processing section 52, the target duty ratio generator 58, and the controller 59 may include, for example, a processor that is able to execute a program.

The image processing section 52 may correspond to an "image processing section" in one specific but non-limiting embodiment of the technology. The image data D2Y, D2M, D2C, and D2W may correspond to a "plurality of pieces of image data" in one specific but non-limiting embodiment of the technology. The yellow toner, the magenta toner, and the cyan toner may correspond to "one or more basic color developers" in one specific but non-limiting embodiment of the technology. The white toner may correspond to an "auxiliary color developer" in one specific but non-limiting embodiment of the technology. The developing units 20Y, 20M, 20C, and 20W may correspond to an "image forming section" in one specific but non-limiting embodiment of the technology. The duty ratio DR may correspond to a "pixel value" in one specific but non-limiting embodiment of the technology. The total duty ratio DRtotal may correspond to a "developer amount" in one specific but non-limiting embodiment of the technology. The target duty ratio DRA may correspond to a "predetermined amount" in one specific but non-limiting embodiment of the technology. The target duty ratio generator 58 may correspond to a "setting section" in one specific but non-limiting embodiment of the technology.

[Operation and Workings]

An operation and workings of the image forming apparatus 1 according to the present example embodiment will now be described.

[Overview of Overall Operation]

First, an overview of an overall operation of the image forming apparatus 1 will be described with reference to FIG. 1. Upon the image forming apparatus 1 receiving the print data DP from a host computer, the image processing section 52 may convert the image data D1 included in the print data DP into the image data D2, i.e., the image data D2Y, D2M, D2C, and D2W. The image data D2 may be bitmap data of a so-called pixel format. In addition, the heater 76B and the fixing roller motor 75B may start operating, and a warm-up operation may thus be performed. This operation may bring the temperature of the fixing section 40 to a temperature appropriate for a fixing operation. Thereafter, the print medium feeding roller motor 71B, the registration roller motor 72B, and the fixing roller motor 75B may start operating. With this operation, the pickup roller 11 may pick up the transfer print medium 9 stored in the print medium container 8, and the print medium feeding roller 12 may convey the transfer print medium 9 along the conveyance path 10. Upon the print medium sensor 13 detecting the transfer print medium 9, the registration roller 15 may correct a skew of the transfer print medium 9 by performing a so-called abutting process. In the abutting process, an operating state of an unillustrated clutch provided in a motive power transmission path from the registration roller motor 72B to the registration roller 15 may enter a state in which no motive power is transmitted, for example, for a predetermine duration, for example, on the basis of the detection result of the print medium sensor 13. With this configuration, the registration roller 15 may stop rotating, and the skew of the transfer print medium 9 may be corrected. Thereafter, upon the clutch entering a state of transmitting motive power, the registration roller 15 may start rotating again, and the transfer print medium 9 may be conveyed.

The photosensitive drum motor 73B and the transfer belt motor 74B may start operating at timing that is sufficiently prior to timing at which the transfer print medium 9 reaches the transfer belt 31. Thereby, the photosensitive drum 21 in each developing unit 20 may rotate, and the transfer belt 31 may circulate at a conveyance speed that is substantially equal to the circumferential speed of the photosensitive drum 21. Thus, the transfer belt 31 may convey the transfer print medium 9 along the four developing units 20.

The high-voltage power source section 61 may generate the charging voltage VCH, the developing voltage VDB, the feeding voltage VSB, and the transfer voltage VTR. In addition, the exposure controller 64 may control the exposure operation in the four exposure units 29 on the basis of the image data D2, i.e., the image data D2Y, D2M, D2C, and D2W. Thereby, first, an electrostatic latent image may be formed on the surface of the photosensitive drum 21 in each developing unit 20. Thereafter, a toner image may be formed, or developed, in accordance with the electrostatic latent image. The toner image on the photosensitive drum 21 in each developing unit 20 may thereafter be transferred onto the transfer target surface of the transfer print medium 9. With this operation, a yellow toner image, a magenta toner image, a cyan toner image, and a white toner image may be formed in this order on the transfer print medium 9. Thus, the white toner image may be formed in the uppermost layer of the transfer print medium 9.

After the trailing end of the transfer print medium 9 passes through the most downstream developing unit 20W among the four developing units 20, the photosensitive drum motor 73B and the transfer belt motor 74B may stop operating. The timing at which the trailing end of the transfer print medium 9 passes through the developing unit 20W may be estimated on the basis of, for example, the size of the transfer print medium 9 and the number of driving pulses of the transfer belt motor 74B counted after the leading end of the transfer print medium 9 has passed through the print medium sensor 18. In another example, the timing at which the trailing end of the transfer print medium 9 passes through the developing unit 20W may be estimated on the basis of the size of the transfer print medium 9 and the number of driving pulses of the transfer belt motor 74B counted after the leading end of the transfer print medium 9 has passed through the print medium sensor 43. In a case where images are to be formed successively on a plurality of transfer print media 9, the photosensitive drum motor 73B and the transfer belt motor 74B may continue operating, and the photosensitive drum motor 73B and the transfer belt motor 74B may stop operating after the trailing end of the last transfer print medium 9 has passed through the developing unit 20W.

Upon the transfer print medium 9 reaching the fixing section 40, the toner on the transfer print medium 9 may be fixed onto the transfer print medium 9 with the heat from the fixing roller 41 heated by the heater 76B and the pressure applied by the backup roller 42. Thereafter, the conveyance path switching section 45 may send out the transfer print medium 9 having the toner fixed thereto to a path selected from the conveyance path 10A, which is the path leading to the face-up stacker 46, and the conveyance path 10B, which is the path leading to the face-down stacker 49. Thereby, the transfer print medium 9 may be discharged to the face-up stacker 46 or the face-down stacker 49.

[Detailed Operation]

An operation of the image processing section 52 will now be described in detail. The image processing section 52 may convert the image data D1 included in the print data DP into the image data D2. The image data D2 may be bitmap data of a so-called pixel format. Upon the conversion, the duty ratio calculator 52A may obtain the duty ratios DR, i.e., the duty ratios DRY, DRM, DRC, and DRW, in each pixel P on the basis of the four pieces of image data D2Y, D2M, D2C, and D2W. Thereafter, the duty ratio calculator 52A may obtain the total value, i.e., the total duty ratio DRtotal, of the four duty ratios DRY, DRM, DRC, and DRW in each pixel P. Further, the duty ratio calculator 52A may correct the duty ratio DRW in each pixel P and thereby cause the total duty ratio DRtotal to become no lower than the target duty ratio DRA in the relevant pixel P. The image processing section 52 may update the white image data D2W on the basis of the corrected duty ratio DRW. This operation will be described below in detail.

Figure 5:
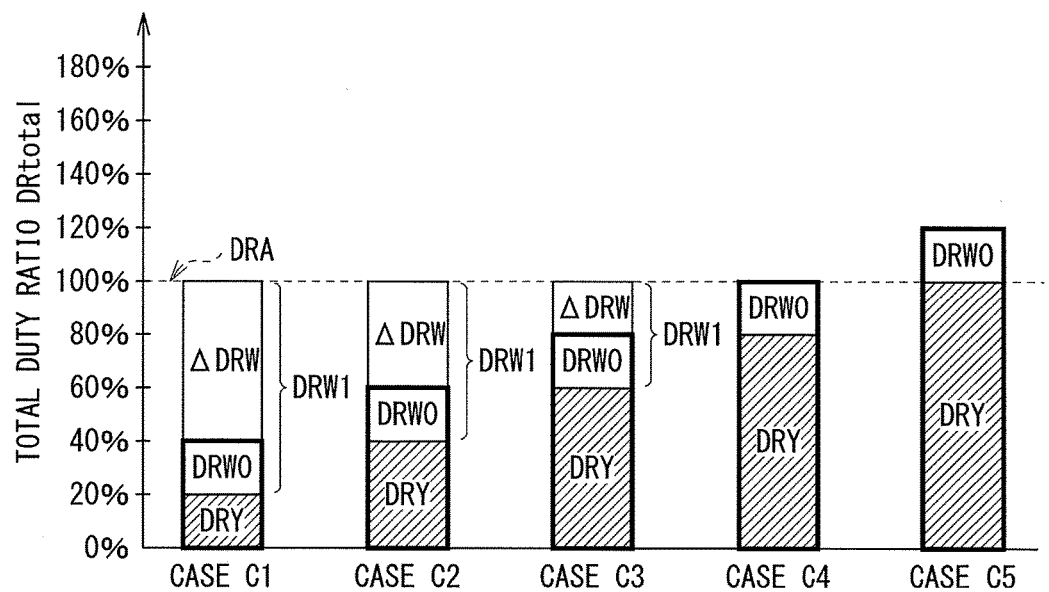
FIG. 5 is a descriptive diagram illustrating an example of an operation of an image forming apparatus according to one embodiment.

FIG. 5 schematically illustrates an operation of the duty ratio calculator 52A. In this example, with five cases C1 to C5 being illustrated as examples, an operation of correcting the duty ratio DRW in a pixel P of interest is illustrated. A duty ratio DRW0 represents an uncorrected duty ratio DRW, and a duty ratio DRW1 represents a corrected duty ratio DRW. The expression ΔDRW represents a correction value of the duty ratio DRW. In FIG. 5, each portion indicated by a thick line represents the total duty ratio DRtotal obtained with the use of the uncorrected duty ratio DRW.

FIG. 5 illustrates an example of so-called single-color image formation in which one of yellow, magenta, and cyan is used. In this example, yellow is used. It is to be noted that this is not a limiting example, and an example may be so-called mixed-color image formation in which two or more colors of yellow, magenta, and cyan are used. In the cases C1 to C5, the duty ratio DRY of yellow is from 20% to 100%, the duty ratio DRW, i.e., DRW0, of white is 20%, and the duty ratio DRM of magenta and the duty ratio DRC of cyan are both 0%. The white toner may be used, for example, to reduce an influence of the ground color of a T-shirt onto an image. Therefore, the duty ratio DRW, i.e., DRW0, may be set to a predetermined value in accordance with the ground color of the T-shirt. The duty ratio DRW, i.e., DRW0, is set to 20% in this example. In addition, the target duty ratio DRA is set to 100% in this example. The target duty ratio DRA may be set in advance in the image forming apparatus 1.

In the case C1, as indicated by the thick line, the duty ratio DRY of yellow is 20%, and the duty ratio DRW, i.e., DRW0, of white is 20%. Therefore, the total duty ratio DRtotal is 40%. In this case, the duty ratio calculator 52A may correct the duty ratio DRW, i.e., DRW1, of white to 80% by setting the correction value ΔDRW to 60%. In other words, in this case, since the total duty ratio DRtotal, which is 40%, is lower than the target duty ratio DRA, which is 100%, the duty ratio calculator 52A may bring the corrected total duty ratio DRtotal to 100% by correcting the duty ratio DRW, i.e., DRW1, of white to 80%.

In the case C2, as indicated by the thick line, the duty ratio DRY of yellow is 40%, and the duty ratio DRW, i.e., DRW0, of white is 20%. Therefore, the total duty ratio DRtotal is 60%. In this case, the duty ratio calculator 52A may correct the duty ratio DRW, i.e., DRW1, of white to 60% by setting the correction value ΔDRW to 40%.

In the case C3, as indicated by the thick line, the duty ratio DRY of yellow is 60%, and the duty ratio DRW, i.e., DRW0, of white is 20%. Therefore, the total duty ratio DRtotal is 80%. In this case, the duty ratio calculator 52A may correct the duty ratio DRW, i.e., DRW1, of white to 40% by setting the correction value ΔDRW to 20%.

In the case C4, as indicated by the thick line, the duty ratio DRY of yellow is 80%, and the duty ratio DRW, i.e., DRW0, of white is 20%. Therefore, the total duty ratio DRtotal is 100%. In this case, the duty ratio calculator 52A may make no correction to the duty ratio DRW. In other words, in this case, since the total duty ratio DRtotal, which is 100%, is at the target duty ratio DRA, which is 100%, the duty ratio calculator 52A may make no correction to the duty ratio DRW.

In the case C5, as indicated by the thick line, the duty ratio DRY of yellow is 100%, and the duty ratio DRW, i.e., DRW0, of white is 20%. Therefore, the total duty ratio DRtotal is 120%. In this case, the duty ratio calculator 52A may make no correction to the duty ratio DRW.

In this manner, in the image forming apparatus 1, the pixel value corresponding to the white toner may be so corrected as to cause the toner amount obtained when the four color toners, i.e., the yellow, magenta, cyan, and white toners, are disposed on each other to fall within a predetermined range. In this example, the duty ratio DRW of white may be so corrected as to cause the total duty ratio DRtotal to become no lower than the target duty ratio DRA. Thereby, the image forming apparatus 1 makes it possible to obtain favorable transfer characteristics when an image is transferred from the transfer print medium 9 onto a T-shirt. In other words, when an image is transferred from the transfer print medium 9 onto a T-shirt, first, a user may place an adhesive on an image portion of the transfer print medium 9 with the use of an adhesive sheet. At this point, in a case where the toner amount on the transfer print medium 9 is small, a sufficient amount of adhesive may not be able to be placed on the image portion of the transfer print medium 9. In such a case, the image on the transfer print medium 9 may not be adhered sufficiently to the T-shirt when the user transfers the image from the transfer print medium 9 onto the T-shirt thereafter with the use of an iron, and the image quality of the image transferred onto the T-shirt may be lowered as a result. In contrast, with the image forming apparatus 1, the duty ratio DRW of white may be so corrected as to cause the total duty ratio DRtotal to become no lower than the target duty ratio DRA. Thus, it is possible to bring the toner amount on the transfer print medium 9 to no smaller than an amount corresponding to the target duty ratio DRA. With this configuration, the image forming apparatus 1 makes it possible to ensure a sufficient amount of adhesive to be placed on the image portion of the transfer print medium 9 and thus makes it possible to obtain favorable transfer characteristics when the image is transferred from the transfer print medium 9 onto a T-shirt. As a result, the image forming apparatus 1 makes it possible to improve the image quality of the image transferred onto a T-shirt.

It is also possible that, for example, a user sets the target duty ratio DRA. For example, the user may input information on the fabric of a T-shirt by operating the operation section 53, and the target duty ratio generator 58 may generate the target duty ratio DRA on the basis of the information input by the user. The information on the fabric of the T-shirt, for example, may be the degree of smoothness of the fabric or may be the type of the fabric. For example, in a case where the degree of smoothness of the fabric is high, the target duty ratio generator 58 may decrease the target duty ratio DRA. In a case where the degree of smoothness of the fabric is low, the target duty ratio generator 58 may increase the target duty ratio DRA. In other words, in a case where the degree of smoothness of the fabric is low, an image may be adhered less easily to the fabric when the image is transferred from the transfer print medium 9 onto the T-shirt, and thus the target duty ratio DRA may be increased. This configuration makes it possible to increase the amount of adhesive to be placed and thus to facilitate the adhesion of the image onto the fabric.

Figure 6:
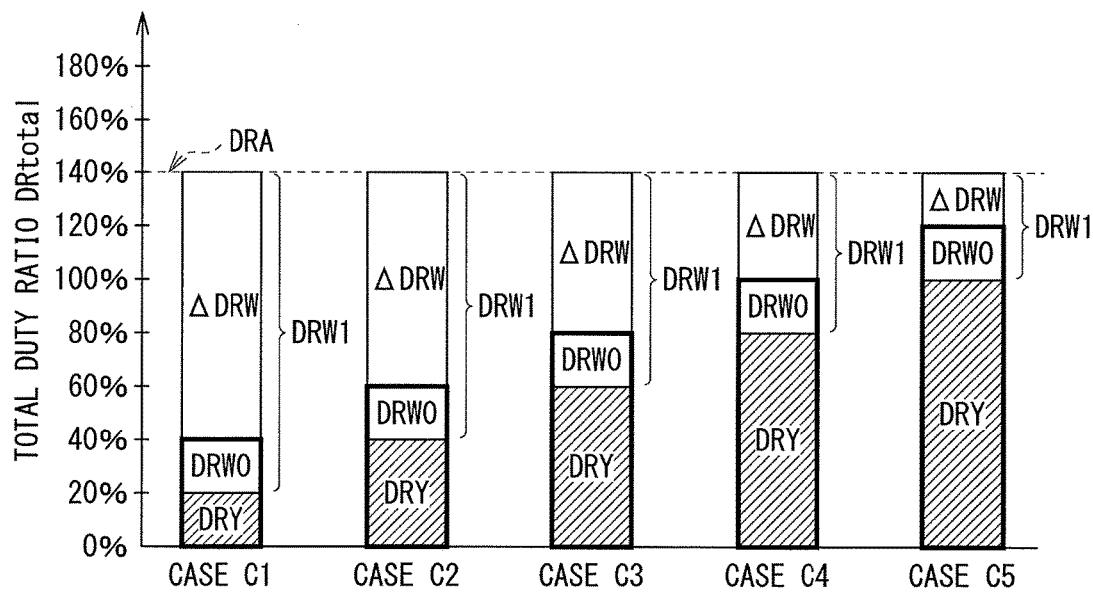
FIG. 6 is a descriptive diagram illustrating another example of an operation of an image forming apparatus according to one embodiment.

FIG. 6 schematically illustrates an operation of the duty ratio calculator 52A to be performed in a case where the target duty ratio DRA is set to a high value. In this example, the target duty ratio DRA is set to 140%. Even in this case, the duty ratio calculator 52A may correct the duty ratio DRW of white and thereby cause the total duty ratio DRtotal to become no lower than the target duty ratio DRA. Thereby, the image forming apparatus 1 makes it possible to further increase the amount of adhesive to be placed on the image portion of the transfer print medium 9 and thus makes it possible to improve the image quality of the image transferred onto the T-shirt.

In addition, for example, the user may input information on a preference of the user by operating the operation section 53, and the target duty ratio generator 58 may generate the target duty ratio DRA on the basis of the information input by the user. The information on the preference of the user, for example, may be a retro style of an image. For example, in a case where an image is to be formed in a retro style, the target duty ratio generator 58 may be able to decrease the target duty ratio DRA. In this case, reducing the amount of adhesive to be placed makes it possible to increase an influence of the ground color of the T-shirt onto the image. Thus, it is possible to obtain a yellowish image in a case where the ground color of the T-shirt is yellow, which makes it possible to form an image in the retro style.

In addition, the user may be allowed to directly input the target duty ratio DRA itself by operating the operation section 53, for example. This may allow the user having full knowledge of the performance of the image forming apparatus 1 to set the setting of the image forming apparatus 1 more directly and in a more detailed manner, for example.

Figure 7:
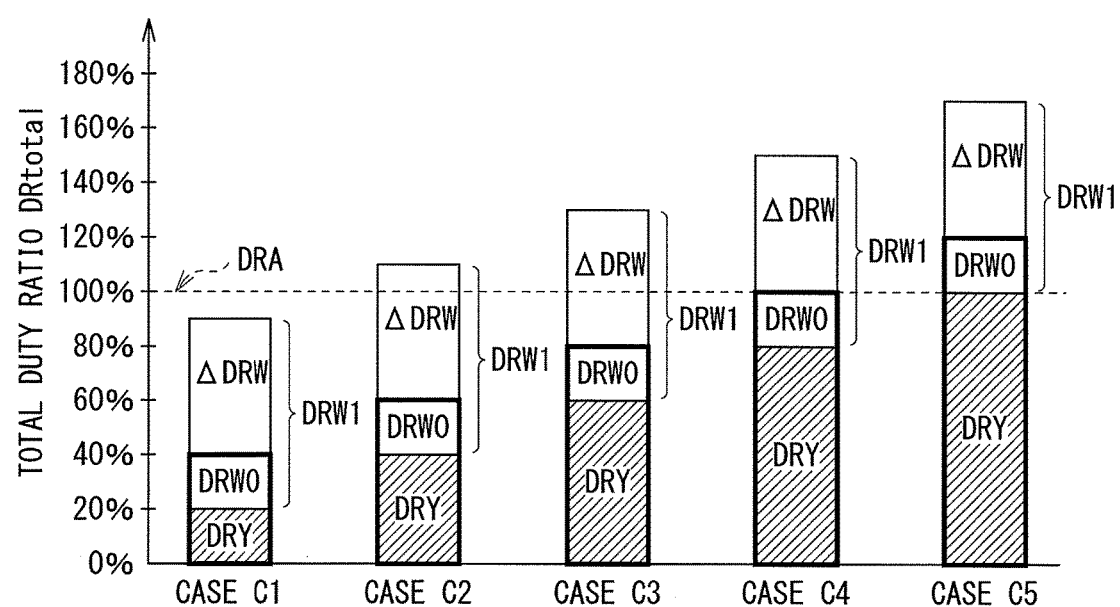
FIG. 7 is a descriptive diagram illustrating an example of an operation of an image forming apparatus according to a reference example.

In addition, the correction value $\Delta DRW$ of the duty ratio DRW of white may be adjusted in accordance with the total duty ratio DRtotal in the image forming apparatus 1, which makes it possible to reduce a consumption amount of the white toner. In other words, for example, in a case where the correction value $\Delta DRW$ is set to a predetermined amount regardless of the total duty ratio DRtotal as in the example illustrated in FIG. 7, the consumption amount of the white toner increases in the cases C2 to C5, in particular. In addition, in this example, the amount of adhesive to be placed is small in the case C1, and thus the image quality may decrease. In contrast, the correction value $\Delta DRW$ of the duty ratio DRW of white may be adjusted in accordance with the total duty ratio DRtotal in the image forming apparatus 1. In one example, in a case where the total duty ratio DRtotal is lower than the target duty ratio DRA, for example, the correction value $\Delta DRW$ may be so adjusted as to cause the total duty ratio DRtotal to become substantially equal to the target duty ratio DRA. In addition, in a case where the total duty ratio DRtotal is no lower than the target duty ratio DRA, no correction may be made to the duty ratio DRW of white. This makes it possible to keep the duty ratio DRW of white at a certain level in the image forming apparatus 1, as illustrated in FIG. 5, which makes it possible to reduce the consumption amount of the white toner.

Figure 8:
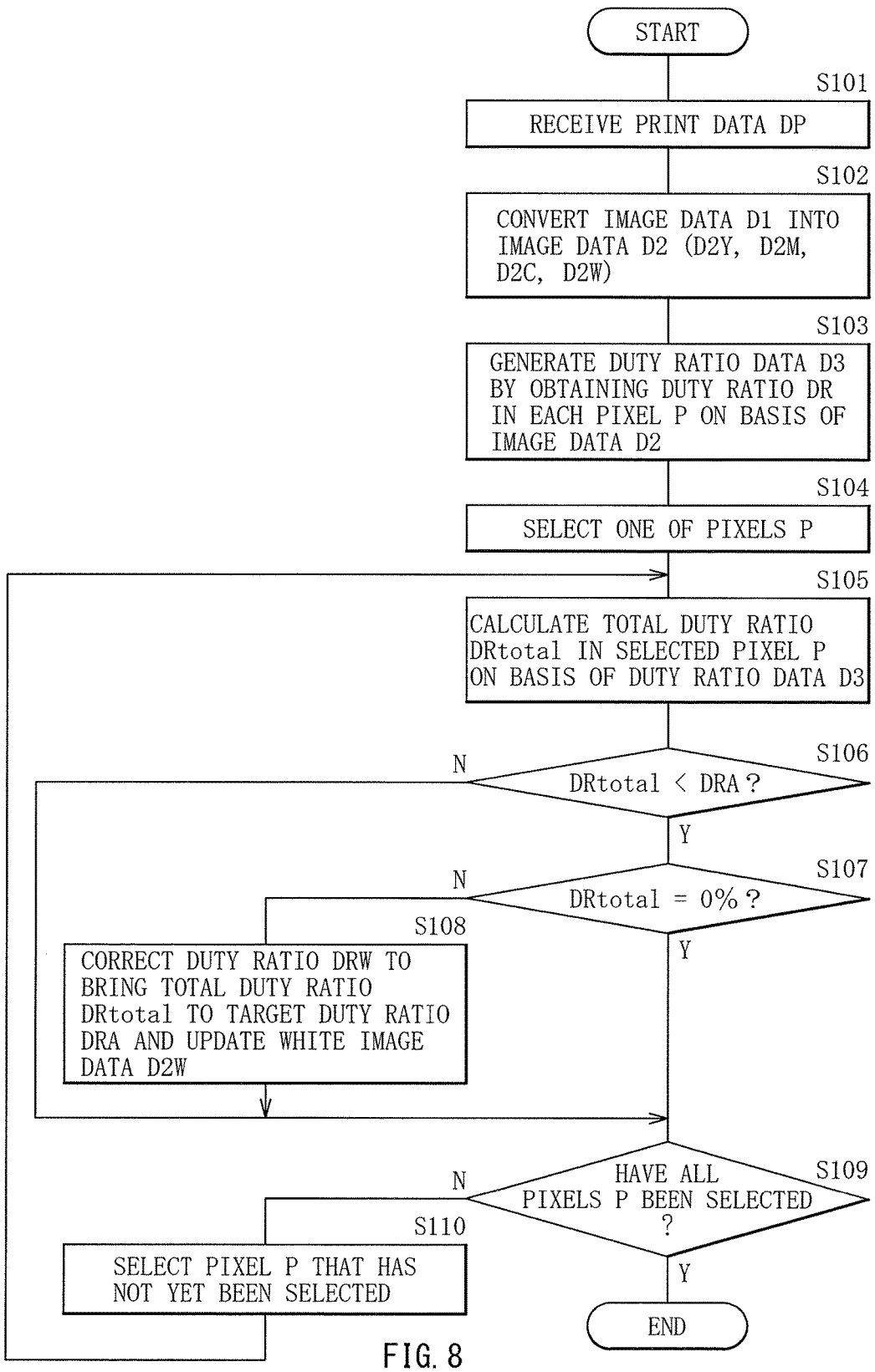
FIG. 8 is a flowchart illustrating an example of an operation of an image forming apparatus according to one embodiment.

FIG. 8 illustrates an example of an operation of generating the image data D2 on the basis of the print data DP in the image forming apparatus 1.

First, the communication section 51 may receive the print data DP transmitted from a host computer (step S101).

Thereafter, the image processing section 52 may convert the image data D1 included in the print data DP into the image data D2, i.e., the image data D2Y, D2M, D2C, and D2W (step S102). The image data D2 may be bitmap data of a so-called pixel format.

Thereafter, the duty ratio calculator 52A of the image processing section 52 may generate duty ratio data D3 by obtaining the duty ratio DR in each pixel P on the basis of the image data D2 (step S103). In one example, the duty ratio calculator 52A may generate duty ratio data D3Y by obtaining the duty ratio DRY in each pixel P on the basis of the yellow image data D2Y. The duty ratio data D3Y may be map data of the duty ratio DRY. In a similar manner, the duty ratio calculator 52A may generate duty ratio data D3M by obtaining the duty ratio DRM in each pixel P on the basis of the magenta image data D2M. The duty ratio data D3M may be map data of the duty ratio DRM. The duty ratio calculator 52A may generate duty ratio data D3C by obtaining the duty ratio DRC in each pixel P on the basis of the cyan image data D2C. The duty ratio data D3C may be map data of the duty ratio DRC. The duty ratio calculator 52A may generate duty ratio data D3W by obtaining the duty ratio DRW in each pixel P on the basis of the white image data D2W. The duty ratio data D3W may be map data of the duty ratio DRW.

Thereafter, the duty ratio calculator 52A may select one of the pixels P (step S104).

Thereafter, the duty ratio calculator 52A may obtain the total duty ratio DRtotal in the selected pixel P on the basis of the duty ratio data D3 (step S105). In one example, the duty ratio calculator 52A may obtain the total duty ratio DRtotal in the selected pixel P by obtaining a total value of the duty ratio DRY in the selected pixel P in the duty ratio data D3Y, the duty ratio DRM in the selected pixel P in the duty ratio data D3M, the duty ratio DRC in the selected pixel P in the duty ratio data D3C, and the duty ratio DRW in the selected pixel P in the duty ratio data D3W.

Thereafter, the duty ratio calculator 52A may determine whether the total duty ratio DRtotal is lower than the target duty ratio DRA, i.e., whether DRtotal<DRA holds (step S106). In a case where the total duty ratio DRtotal is no lower than the target duty ratio DRA ("N" in step S106), the duty ratio calculator 52A may proceed to step S109. In other words, in this case, since the total duty ratio DRtotal is at or higher than the target duty ratio DRA as in the cases C4 and C5 illustrated in FIG. 5, it is possible to ensure a certain amount of adhesive to be placed. Therefore, the duty ratio calculator 52A may make no correction to the duty ratio DRW.

In a case where it is determined in step S106 that the total duty ratio DRtotal is lower than the target duty ratio DRA ("Y" in step S106), the duty ratio calculator 52A may determine whether the total duty ratio DRtotal is 0%, i.e., whether DRtotal=0% holds (step S107). In a case where the total duty ratio DRtotal is 0% ("Y" in step S107), the duty ratio calculator 52A may proceed to step S109. In other words, in this case, no image may be formed, and thus the duty ratio calculator 52A may make no correction to the duty ratio DRW.

In a case where it is determined in step S107 that the total duty ratio DRtotal is not 0% ("N" in step S107), the duty ratio calculator 52A may correct the duty ratio DRW to bring the total duty ratio DRtotal to the target duty ratio DRA and may update the white image data D2W on the basis of the corrected duty ratio DRW (step S108). Thereafter, the duty ratio calculator 52A may proceed to step S109.

Thereafter, the duty ratio calculator 52A may determine whether all of the pixels P in the image data D2 have been selected (step S109). In a case where not all of the pixels P have been selected ("N" in step S109), the duty ratio calculator 52A may select a pixel P that has not yet been selected (step S110) and return to step S105. Thereafter, the operation in steps S105 to S110 may be repeated until all of the pixels P are selected.

In a case where it is determined in step S109 that all of the pixels P have been selected ("Y" in step S109), the flow is brought to an end.

[Example Effects]

As described thus far, in the present example embodiment, the duty ratio of white may be so corrected as to cause the total duty ratio to become no lower than the target duty ratio. Thus, it is possible to obtain favorable transfer characteristics when an image is transferred from a transfer print medium onto a T-shirt and thus to improve the image quality.

In the present example embodiment, the correction value of the duty ratio of white may be adjusted in accordance with the total duty ratio. Thus, it is possible to reduce the consumption amount of the white toner.

2. Second Example Embodiment

An image forming apparatus 2 according to a second example embodiment will now be described. In the present example embodiment, the duty ratio DRW of white may be corrected on the basis of a plurality of target duty ratios. It is to be noted that components that are substantially identical to those of the image forming apparatus 1 according to the first example embodiment described above will be given identical reference characters, and descriptions thereof will be omitted as appropriate.

As illustrated in FIG. 3, the image forming apparatus 2 may include an image processing section 82, a non-volatile memory 87, a target duty ratio generator 88, and a controller 89.

The image processing section 82 may include a duty ratio calculator 82A. The duty ratio calculator 82A may obtain the duty ratios DR, i.e., the duty ratios DRY, DRM, DRC, and DRW, in each pixel P on the basis of the four pieces of image data D2Y, D2M, D2C, and D2W, respectively. The duty ratio calculator 82A may obtain the total value, i.e., the total duty ratio DRtotal, of the four duty ratios DRY, DRM, DRC, and DRW in each pixel P. The duty ratio calculator 82A may correct the duty ratio DRW in a given single-color pixel P and thereby cause the total duty ratio DRtotal to become no lower than the target duty ratio DRA in that pixel P. The duty ratio calculator 82A may also correct the duty ratio DRW in a given mixed-color pixel P and thereby cause the total duty ratio DRtotal to become no lower than a target duty ratio DRB in that pixel P. Thereafter, the duty ratio calculator 82A may update the white image data D2W on the basis of the corrected duty ratio DRW.

The non-volatile memory 87 may hold duty ratio information INF2. The duty ratio information INF2 may hold the target duty ratios DRA and DRB. The target duty ratio DRA may be such a total duty ratio DRtotal that makes it possible to obtain favorable transfer characteristics when a single-color image including only one color of yellow, magenta, and cyan is transferred from the transfer print medium 9 onto a T-shirt. The target duty ratio DRB may be such a total duty ratio DRtotal that makes it possible to obtain favorable transfer characteristics when a mixed-color image including two or more colors of yellow, magenta, and cyan is transferred from the transfer print medium 9 onto a T-shirt. The target duty ratio DRB may be higher than the target duty ratio DRA. The target duty ratios DRA and DRB may be set in advance in the image forming apparatus 2. In addition, the non-volatile memory 87 may be able to hold, as the duty ratio information INF2, the target duty ratios DRA and DRB generated on the basis of a user operation in accordance with an instruction from the target duty ratio generator 88.

The target duty ratio generator 88 may generate the target duty ratios DRA and DRB on the basis of information input by the user operating the operation section 53, for example. The generated target duty ratios DRA and DRB may be stored as the duty ratio information INF2 into the non-volatile memory 87.

The controller 89 may control an overall operation of the image forming apparatus 2 by controlling an operation of each block in the image forming apparatus 2.

Figure 9:
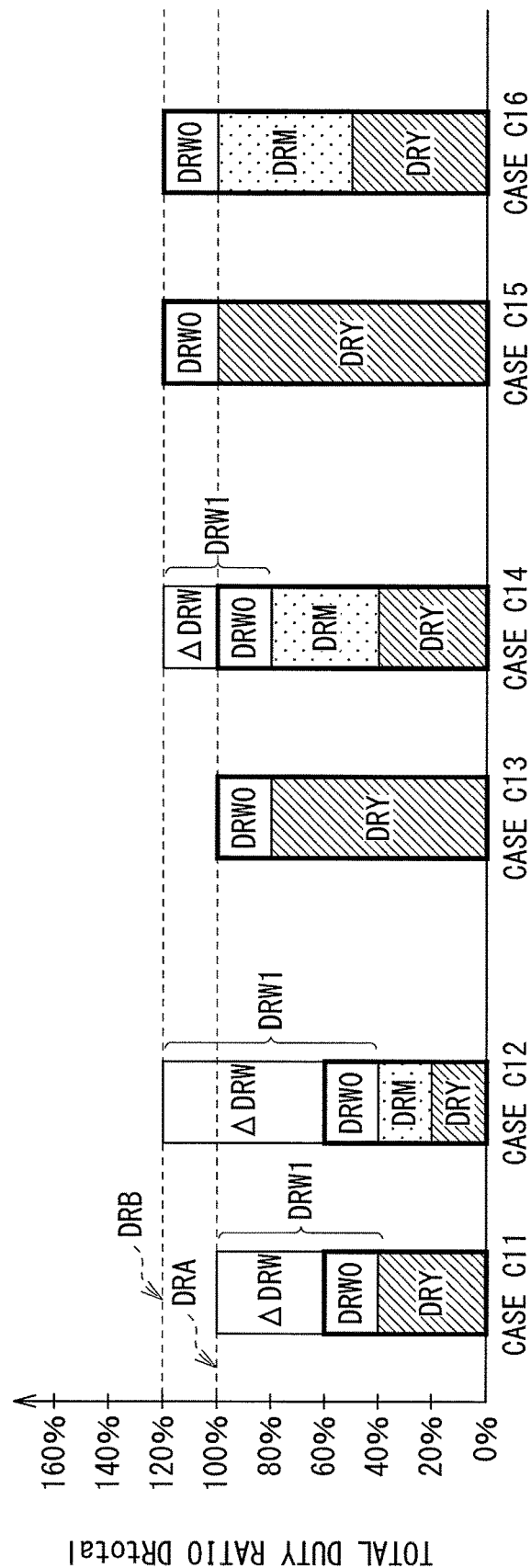
FIG. 9 is a descriptive diagram illustrating an example of an operation of an image forming apparatus according to one embodiment.

FIG. 9 schematically illustrates an operation of the duty ratio calculator 82A. In this example, with six cases C11 to C16 being illustrated as examples, an operation of correcting the duty ratio DRW in a pixel P of interest is illustrated. In FIG. 9, each portion indicated by a thick line may represent the total duty ratio DRtotal obtained with the use of the uncorrected duty ratio DRW.

The cases C11, C13, and C15 are for illustrating an operation example with a single color, and the cases C12, C14, and C16 are for illustrating an operation example with a mixed color. In the cases C11, C13, and C15, the duty ratio DRY of yellow is from 40% to 100%, the duty ratio DRW, i.e., DRW0, of white is 20%, and the duty ratio DRM of magenta and the duty ratio DRC of cyan are both 0%. In the cases C12, C14, and C16, the duty ratio DRY of yellow and the duty ratio DRM of magenta are each from 20% to 50%, the duty ratio DRW, i.e., DRW0, of white is 20%, and the duty ratio DRC of cyan is 0%. In the cases C11 and C12, the total duty ratios DRtotal in an uncorrected state may be equal to each other. In a similar manner, in the cases C13 and C14, the total duty ratios DRtotal in an uncorrected state may be equal to each other. In the cases C15 and C16, the total duty ratios DRtotal in an uncorrected state may be equal to each other. In this example, the target duty ratio DRA is set to 100%, and the target duty ratio DRB is set to 120%.

In the case C11, as indicated by the thick line, the duty ratio DRY of yellow is 40%, and the duty ratio DRW, i.e., DRW0, of white is 20%. Therefore, the total duty ratio DRtotal is 60%. In this case, the duty ratio calculator 82A may correct the duty ratio DRW, i.e., DRW1, of white to 60% by setting the correction value ΔDRW to 40%. In other words, in this case, since only the duty ratio DR of one color of yellow, magenta, and cyan, i.e., only the duty ratio DR of yellow, is positive, the duty ratio calculator 82A may determine that this is a case of a single color and select the target duty ratio DRA from the target duty ratios DRA and DRB. Further, since the total duty ratio DRtotal, which is 60%, is lower than the target duty ratio DRA, which is 100%, the duty ratio calculator 82A may bring the corrected total duty ratio DRtotal to 100% by correcting the duty ratio DRW, i.e., DRW1, of white to 60%.

In the case C12, as indicated by the thick line, the duty ratio DRY of yellow is 20%, the duty ratio DRM of magenta is 20%, and the duty ratio DRW, i.e., DRW0, of white is 20%. Therefore, the total duty ratio DRtotal is 60%. In this case, the duty ratio calculator 82A may correct the duty ratio DRW, i.e., DRW1, of white to 80% by setting the correction value ΔDRW to 60%. In other words, in this case, since the duty ratios DR of two colors of yellow, magenta, and cyan, i.e., the duty ratios DR of yellow and magenta, are positive, the duty ratio calculator 82A may determine that this is a case of a mixed color and select the target duty ratio DRB from the target duty ratios DRA and DRB. Further, since the total duty ratio DRtotal, which is 60%, is lower than the target duty ratio DRB, which is 120%, the duty ratio calculator 82A may bring the corrected total duty ratio DRtotal to 120% by correcting the duty ratio DRW, i.e., DRW1, of white to 80%.

In the case C13, as indicated by the thick line, the duty ratio DRY of yellow is 80%, and the duty ratio DRW, i.e., DRW0, of white is 20%. Therefore, the total duty ratio DRtotal is 100%. In this case, the duty ratio calculator 82A may make no correction to the duty ratio DRW. In other words, in this case, since only the duty ratio DR of one color of yellow, magenta, and cyan, i.e., the duty ratio DR of yellow, is positive, the duty ratio calculator 82A may determine that this is a case of a single color and select the target duty ratio DRA from the target duty ratios DRA and DRB. Further, since the total duty ratio DRtotal, which is 100%, is at the target duty ratio DRA, which is 100%, the duty ratio calculator 82A may make no correction to the duty ratio DRW.

In the case C14, as indicated by the thick line, the duty ratio DRY of yellow is 40%, the duty ratio DRM of magenta is 40%, and the duty ratio DRW, i.e., DRW0, of white is 20%. Therefore, the total duty ratio DRtotal is 100%. In this case, the duty ratio calculator 82A may correct the duty ratio DRW, i.e., DRW1, of white to 40% by setting the correction value ΔDRW to 20%. In other words, in this case, since the duty ratios DR of two colors of yellow, magenta, and cyan, i.e., the duty ratios DR of yellow and magenta, are positive, the duty ratio calculator 82A may determine that this is a case of a mixed color and select the target duty ratio DRB from the target duty ratios DRA and DRB. Further, since the total duty ratio DRtotal, which is 100%, is lower than the target duty ratio DRB, which is 120%, the duty ratio calculator 82A may bring the corrected total duty ratio DRtotal to 120% by correcting the duty ratio DRW of white to 40%.

In the case C15, as indicated by the thick line, the duty ratio DRY of yellow is 100%, and the duty ratio DRW, i.e., DRW0, of white is 20%. Therefore, the total duty ratio DRtotal is 120%. In this case, the duty ratio calculator 82A may make no correction to the duty ratio DRW. In other words, in this case, since only the duty ratio DR of one color of yellow, magenta, and cyan, i.e., only the duty ratio DR of yellow, is positive, the duty ratio calculator 82A may determine that this is a case of a single color and select the target duty ratio DRA from the target duty ratios DRA and DRB. Further, since the total duty ratio DRtotal, which is 120%, is higher than the target duty ratio DRA, which is 100%, the duty ratio calculator 82A may make no correction to the duty ratio DRW.

In the case C16, as indicated by the thick line, the duty ratio DRY of yellow is 50%, the duty ratio DRM of magenta is 50%, and the duty ratio DRW, i.e., DRW0, of white is 20%. Therefore, the total duty ratio DRtotal is 120%. In this case, the duty ratio calculator 82A may make no correction to the duty ratio DRW. In other words, in this case, since the duty ratios DR of two colors of yellow, magenta, and cyan, i.e., the duty ratios DR of yellow and magenta, are positive, the duty ratio calculator 82A may determine that this is a case of a mixed color and select the target duty ratio DRB from the target duty ratios DRA and DRB. Further, since the total duty ratio DRtotal, which is 120%, is at the target duty ratio DRB, which is 120%, the duty ratio calculator 82A may make no correction to the duty ratio DRW.

In this manner, in the image forming apparatus 2, the target duty ratio may be set in accordance with the number of colors composing an image, and the duty ratio DRW of white may be corrected with the use of the set target duty ratio. Thus, it is possible to obtain favorable transfer characteristics when an image is transferred from the transfer print medium 9 onto a T-shirt. In other words, when an adhesive is placed onto an image portion of the transfer print medium 9 with the use of an adhesive sheet, the amount of adhesive to be placed on the image portion of the transfer print medium 9 may be reduced as the number of colors is greater. In the image forming apparatus 2, one of a plurality of target duty ratios, e.g., of two target duty ratios DRA and DRB in this example, may be selected in accordance with the number of colors composing the image. In the example described above, the target duty ratio DRA may be selected in the case of a single color, and the target duty ratio DRB, which is higher than the target duty ratio DRA, may be selected in the case of a mixed color. Thereby, the image forming apparatus 2 makes it possible to increase the amount of adhesive to be placed on the image portion of the transfer print medium 9 in the case of a mixed color as compared to that in the case of a single color and to thus makes it possible to improve the image quality of the image transferred onto the T-shirt.

Moreover, in the image forming apparatus 2, the number of colors composing an image may be determined in each pixel P, and the target duty ratio may be set in accordance with the determination result. In one example, the image forming apparatus 2 may select the target duty ratio DRA in a pixel P with a single color and select the target duty ratio DRB, which is higher than the target duty ratio DRA, in a pixel P with a mixed color. This makes it possible to decrease the duty ratio DR of white in a pixel P with a single color as compared to that in a pixel P with a mixed color. Thus, it is possible to reduce the consumption amount of the white toner more effectively.

Figure 10A:
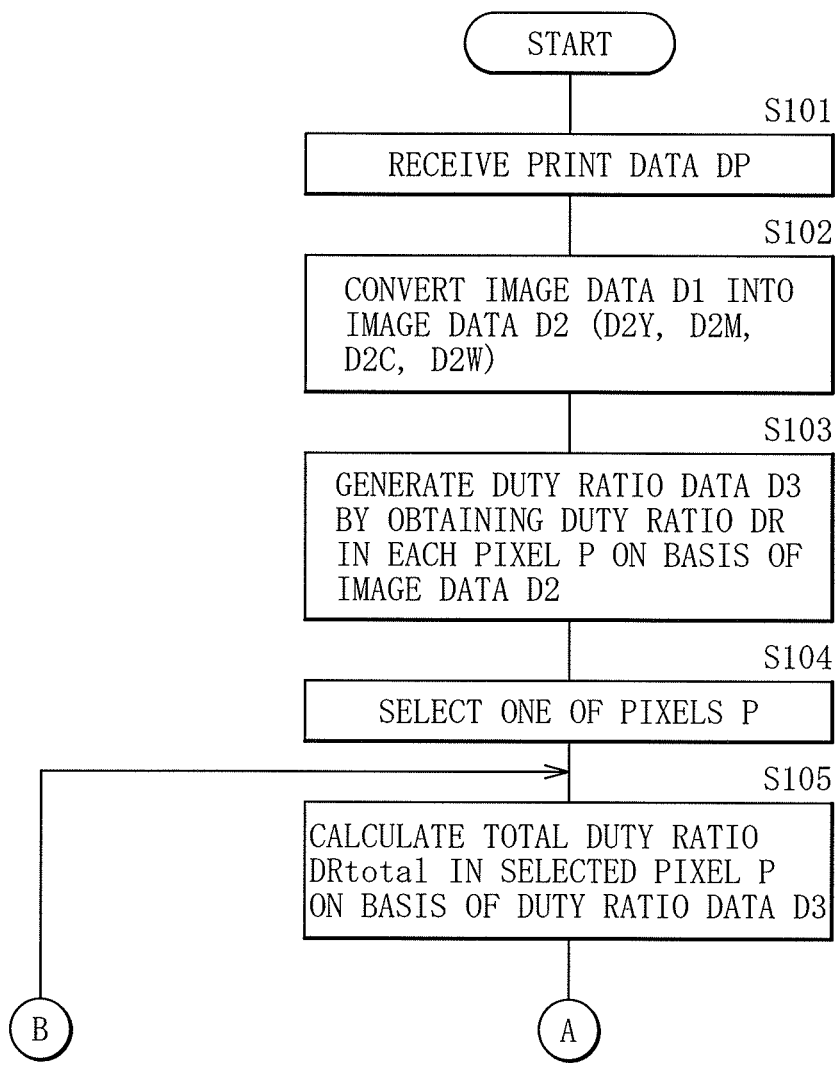
FIG. 10A is a flowchart illustrating an example of an operation of an image forming apparatus according to one embodiment.
Figure 10B:
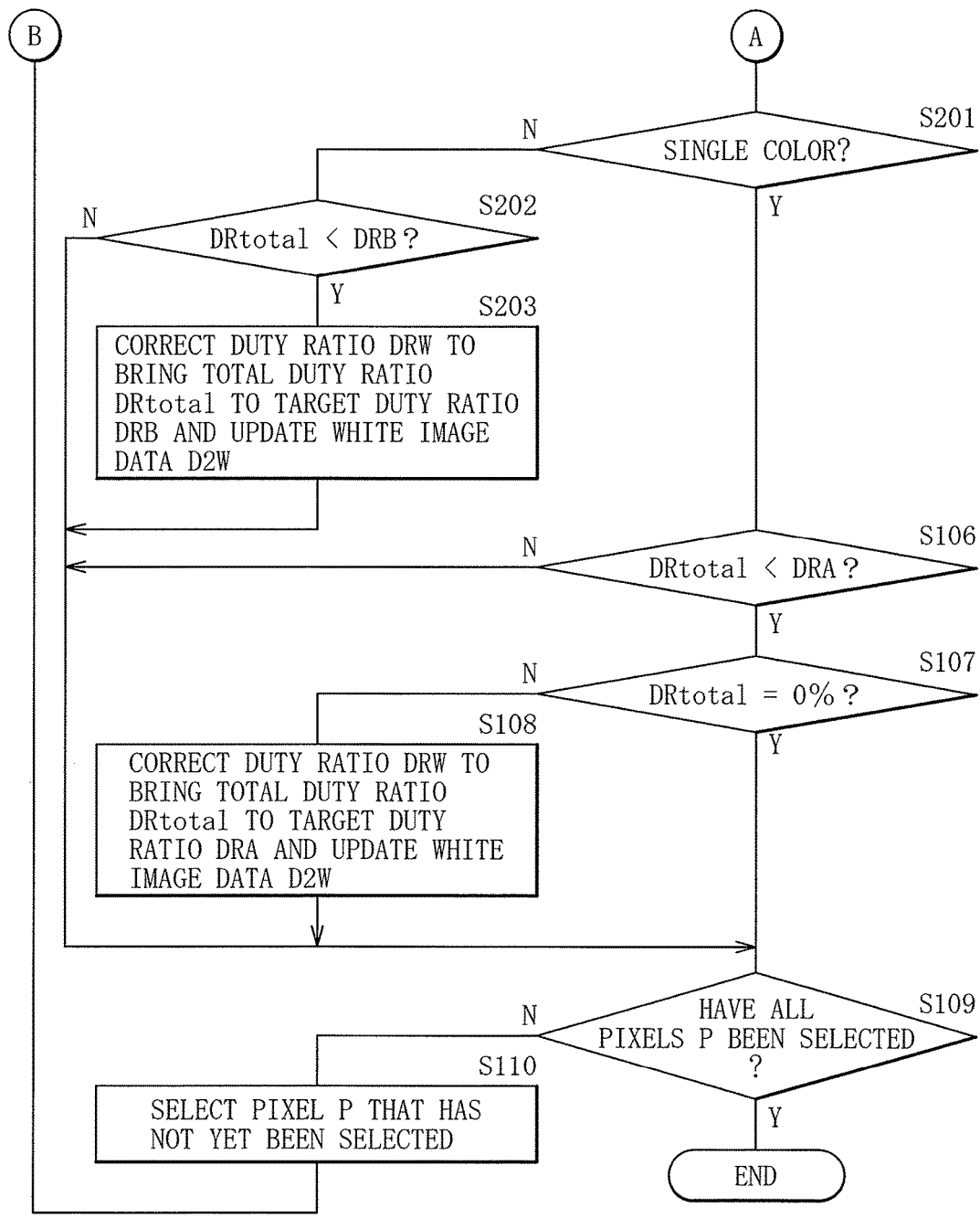
FIG. 10B is another flowchart illustrating an example of an operation of an image forming apparatus according to one embodiment.

FIGS. 10A and 10B illustrate an example of an operation of generating the image data D2 on the basis of the print data DP in the image forming apparatus 2.

Similarly to the case of the image forming apparatus 1 as illustrated in FIG. 8, first, the communication section 51 may receive the print data DP transmitted from a host computer (step S101), and the image processing section 82 may convert the image data D1 included in the print data DP into the image data D2, i.e., the image data D2Y, D2M, D2C, and D2W (step S102). The image data D2 may be bitmap data of a so-called pixel format. Thereafter, the duty ratio calculator 82A of the image processing section 82 may generate the duty ratio data D3 by obtaining the duty ratio DR in each pixel P on the basis of the image data D2 (step S103).

Thereafter, the duty ratio calculator 82A may select one of the pixels P (step S104).

Thereafter, the duty ratio calculator 82A may obtain the total duty ratio DRtotal in the selected pixel P on the basis of the duty ratio data D3 (step S105).

Thereafter, the duty ratio calculator 82A may determine whether it is a case of a single color (step S201).

In a case where it is determined in step S201 that it is a case of a mixed color ("N" in step S201), the duty ratio calculator 82A may determine whether the total duty ratio DRtotal is lower than the target duty ratio DRB, i.e., whether DRtotal<DRB holds (step S202).

In a case where it is determined in step S202 that the total duty ratio DRtotal is no lower than the target duty ratio DRB ("N" in step S202), the duty ratio calculator 82A may proceed to step S109. In other words, in this case, since the total duty ratio DRtotal is at or higher than the target duty ratio DRB, for example, as in the case C16 illustrated in FIG. 9, it is possible to ensure a certain amount of adhesive to be placed, and thus the duty ratio calculator 82A may make no correction to the duty ratio DRW.

In a case where it is determined in step S202 that the total duty ratio DRtotal is lower than the target duty ratio DRB ("Y" in step S202), the duty ratio calculator 82A may correct the duty ratio DRW to bring the total duty ratio DRtotal to the target duty ratio DRB and update the white image data D2W on the basis of the corrected duty ratio DRW (step S203). Thereafter, the duty ratio calculator 82A may proceed to step S109.

In a case where it is determined in step S201 that it is a case of a single color ("Y" in step S201), the duty ratio calculator 82A may determine whether the total duty ratio DRtotal is lower than the target duty ratio DRA, i.e., whether DRtotal<DRA holds (step S106). In a case where the total duty ratio DRtotal is no lower than the target duty ratio DRA ("N" in step S106), the duty ratio calculator 82A may proceed to step S109.

In a case where it is determined in step S106 that the total duty ratio DRtotal is lower than the target duty ratio DRA ("Y" in step S106), the duty ratio calculator 82A may determine whether the total duty ratio DRtotal is 0%, i.e., whether DRtotal=0% holds (step S107). In a case where the total duty ratio DRtotal is 0% ("Y" in step S107), the duty ratio calculator 82A may proceed to step S109.

In a case where it is determined in step S107 that the total duty ratio DRtotal is not 0% ("N" in step S107), the duty ratio calculator 82A may correct the duty ratio DRW to bring the total duty ratio DRtotal to the target duty ratio DRA and update the white image data D2W on the basis of the corrected duty ratio DRW (step S108). Thereafter, the duty ratio calculator 82A may proceed to step S109.

Thereafter, the duty ratio calculator 82A may determine whether all of the pixels P in the image data D2 have been selected (step S109). In a case where not all of the pixels P have been selected ("N" in step S109), the duty ratio calculator 82A may select a pixel P that has not yet been selected (step S110) and return to step S105.

In a case where it is determined in step S109 that all of the pixels P have been selected ("Y" in step S109), the flow is brought to an end.

As described thus far, in the present example embodiment, the target duty ratio may be set in accordance with the number of colors composing an image. Thus, in a case of a mixed color, for example, it is possible to increase the amount of adhesive to be placed in an image portion of a transfer print medium and thus to improve the image quality.

In the present example embodiment, the number of colors composing an image may be determined in each pixel P, and the target duty ratio may be set in accordance with the determination result. Thus, it is possible to reduce the consumption amount of the white toner more effectively.

Other effects may be similar to those in the first example embodiment described above.

Thus far, the technology has been described with reference to some example embodiments. The technology, however, is not limited to these example embodiments, etc. and various modifications are possible.

For example, an image may be transferred from the transfer print medium 9 onto a T-shirt in each of the example embodiments described above; however, this is not a limiting example. For example, it is possible to transfer an image onto various media on which an image may be formed less easily in an image forming apparatus.

Moreover, for example, an image may be formed with the use of toners of four colors, i.e., yellow, magenta, cyan, and white, in each of the example embodiments described above; however, this is not a limiting example. Alternatively, for example, an image may be formed with the use of toners of two colors or three colors, or an image may be formed with the use of toners of five colors, e.g., yellow, magenta, cyan, black, and white.

Moreover, for example, the duty ratio DRW of white may be corrected in the example embodiments described above; however, this is not a limiting example. For example, in a case where a transparent toner is used to provide a glossy image, the duty ratio DR of the transparent toner may be corrected. In this case, a developing unit for forming an image with the use of the transparent toner may be disposed on the most downstream side or the most upstream side in the conveying direction F.

Moreover, for example, the technology may be applied to a single-function printer in the example embodiments described above; however, this is not a limiting example. Alternatively, the technology may be applied, for example, to a copier or may be applied, for example, to as a so-called multifunction peripheral (MFP) having functions such as a copy function, a fax function, a scan function, and a print function.

Morever, for example, toner images formed by the developing units 20 may be transferred directly onto the transfer print medium 9 in the example embodiments described above; however, this is not a limiting example. Alternatively, for example, toner images formed by the developing units 20 may be transferred once onto an intermediate transfer belt, and the toner images that have been transferred onto the intermediate transfer belt may be transferred onto the transfer print medium 9.

Furthermore, the technology encompasses any possible combination of some or all of the various embodiments and the modifications described herein and incorporated herein. It is possible to achieve at least the following configurations from the above-described example embodiments of the technology.

(1)

An image forming apparatus including:

an image processing section that corrects, on the basis of a plurality of pieces of image data, a pixel value corresponding to an auxiliary color developer in a first pixel and thereby causes a developer amount in the first pixel to fall within a predetermined range, the plurality of pieces of image data corresponding to respective developers including one or more basic color developers that configure an image and the auxiliary color developer, the developer amount in the first pixel being a total amount of the one or more basic color developers and the auxiliary color developer in the first pixel when the one or more basic color developers and the auxiliary color developer are disposed on each other; and an image forming section that forms an image on a transfer print medium on the basis of the pieces of image data processed by the image processing section.

(2)

The image forming apparatus according to (1), in which the image processing section corrects the pixel value corresponding to the auxiliary color developer and thereby causes the developer amount to become no smaller than a predetermined amount.

(3)

The image forming apparatus according to (2), in which the image processing section corrects the pixel value corresponding to the auxiliary color developer and thereby causes the developer amount to become equal to the predetermined amount, when the developer amount is smaller than the predetermined amount.

(4)

The image forming apparatus according to (2) or (3), in which the image processing section sets the predetermined amount on the basis of pixel values in the first pixel in the respective pieces of image data.

(5)

The image forming apparatus according to (4), in which the image processing section sets the predetermined amount on the basis of number of pixel values that are not zero among the pixel values in the first pixel in the respective pieces of image data.

(6)

The image forming apparatus according to (2) or (3), further including:

an operation section that receives a user operation; and a setting section that sets the predetermined amount on the basis of an instruction provided from the operation section.

(7)

The image forming apparatus according to (6), in which the image formed on the transfer print medium is an image to be transferred onto a transfer target surface of an object, and the instruction provided from the operation section includes information on a condition of the transfer target surface of the object.

(8)

The image forming apparatus according to any one of (1) to (7), in which the image processing section further corrects a pixel value corresponding to the auxiliary color developer in a second pixel and thereby causes a developer amount in the second pixel to fall within the predetermined range, the developer amount in the second pixel being the total amount of the one or more basic color developers and the auxiliary color developer in the second pixel when the one or more basic color developers and the auxiliary color developer are disposed on each other.

(9)

The image forming apparatus according to any one of (1) to (8), in which the image forming section forms, on the transfer print medium, the image by disposing the auxiliary color developer on the one or more basic color developers.

(10)

The image forming apparatus according to any one of (1) to (9), in which the auxiliary color developer has a color of white.

(11)

The image forming apparatus according to any one of (1) to (10), in which any of the one or more basic color developers has one of colors of yellow, magenta, and cyan.

With the image forming apparatus according to one embodiment of the technology, the pixel value corresponding to the auxiliary color developer is so corrected as to cause the developer amount, which is the total amount of the one or more basic color developers and the auxiliary color developer when the one or more basic color developers and the auxiliary color developer are disposed on each other, to fall within the predetermined range. Thus, it is possible to improve the image quality.

Each of the image processing sections 52 and 82 illustrated in FIG. 3 is implementable by circuitry that includes at least one of a field programmable gate array (FPGA), a semiconductor integrated circuit, and an application specific integrated circuit (ASIC). The FPGA is an integrated circuit (IC) designed to be configured after manufacturing in order to perform all or a part of the functions of each of the image processing sections 52 and 82 illustrated in FIG. 3. The ASIC is an IC customized to perform all or a part of the functions of each of the image processing sections 52 and 82 illustrated in FIG. 3. The semiconductor integrated circuit may be, for example, at least one processor such as a central processing unit (CPU). The processor may be configurable to read instructions from at least one machine readable tangible non-transitory medium to thereby perform all or a part of functions of each of the image processing sections 52 and 82 illustrated in FIG. 3. The form of such a medium may include, for example, any type of magnetic medium, any type of optical medium, or any type of semiconductor memory (i.e., semiconductor circuit). The magnetic medium may be a hard disk, for example. The optical medium may be a CD or a DVD, for example. The semiconductor memory may be a volatile memory or a non-volatile memory, for example. The volatile memory may include a DRAM or a SRAM, for example. The nonvolatile memory may include a ROM or a NVRAM, for example.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An image forming apparatus comprising:
    an image processing section that corrects, on a basis of a plurality of pieces of image data, a pixel value corresponding to an auxiliary color developer in a first pixel and thereby causes a developer amount in the first pixel to fall within a predetermined range, the plurality of pieces of image data corresponding to respective developers including one or more basic color developers that configure an image and the auxiliary color developer, the developer amount in the first pixel being a total amount of the one or more basic color developers and the auxiliary color developer in the first pixel when the one or more basic color developers and the auxiliary color developer are disposed on each other; and
    an image forming section that forms an image on a transfer print medium on a basis of the pieces of image data processed by the image processing section.

2. The image forming apparatus according to claim 1, wherein the image processing section corrects the pixel value corresponding to the auxiliary color developer and thereby causes the developer amount to become no smaller than a predetermined amount.

3. The image forming apparatus according to claim 2, wherein the image processing section corrects the pixel value corresponding to the auxiliary color developer and thereby causes the developer amount to become equal to the predetermined amount, when the developer amount is smaller than the predetermined amount.

4. The image forming apparatus according to claim 2, wherein the image processing section sets the predetermined amount on a basis of pixel values in the first pixel in the respective pieces of image data.

5. The image forming apparatus according to claim 4, wherein the image processing section sets the predetermined amount on a basis of number of pixel values that are not zero among the pixel values in the first pixel in the respective pieces of image data.

6. The image forming apparatus according to claim 2, further comprising:
    an operation section that receives a user operation; and
    a setting section that sets the predetermined amount on a basis of an instruction provided from the operation section.

7. The image forming apparatus according to claim 6, wherein
    the image formed on the transfer print medium is an image to be transferred onto a transfer target surface of an object, and
    the instruction provided from the operation section includes information on a condition of the transfer target surface of the object.

8. The image forming apparatus according to claim 1, wherein the image processing section further corrects a pixel value corresponding to the auxiliary color developer in a second pixel and thereby causes a developer amount in the second pixel to fall within the predetermined range, the developer amount in the second pixel being the total amount of the one or more basic color developers and the auxiliary color developer in the second pixel when the one or more basic color developers and the auxiliary color developer are disposed on each other.

9. The image forming apparatus according to claim 1, wherein the image forming section forms, on the transfer print medium, the image by disposing the auxiliary color developer on the one or more basic color developers.

10. The image forming apparatus according to claim 1, wherein the auxiliary color developer has a color of white.

11. The image forming apparatus according to claim 1, wherein any of the one or more basic color developers has one of colors of yellow, magenta, and cyan.

* * * * *